US008827380B2

(12) United States Patent
Druckenmueller

(10) Patent No.: US 8,827,380 B2
(45) Date of Patent: Sep. 9, 2014

(54) HYDRAULIC VEHICLE BRAKING SYSTEM

(75) Inventor: Heiko Druckenmueller, Steinheim A.D. Murr (DE)

(73) Assignee: Robert Bosch GmbH, Stuttgart (DE)

( * ) Notice: Subject to any disclaimer, the term of this patent is extended or adjusted under 35 U.S.C. 154(b) by 39 days.

(21) Appl. No.: 13/518,459

(22) PCT Filed: Oct. 29, 2010

(86) PCT No.: PCT/EP2010/066436
§ 371 (c)(1),
(2), (4) Date: Jun. 22, 2012

(87) PCT Pub. No.: WO2011/076470
PCT Pub. Date: Jun. 30, 2011

(65) Prior Publication Data
US 2012/0256478 A1     Oct. 11, 2012

(30) Foreign Application Priority Data

Dec. 23, 2009   (DE) .......................... 10 2009 055 224

(51) Int. Cl.
*B60T 13/138* (2006.01)
*B60T 8/40* (2006.01)
*B60T 7/04* (2006.01)
*B60T 13/14* (2006.01)
*B60T 8/48* (2006.01)
*B60T 8/42* (2006.01)

(52) U.S. Cl.
CPC .............. *B60T 7/042* (2013.01); *B60T 8/4081* (2013.01); *B60T 13/142* (2013.01); *B60T 8/4872* (2013.01); *B60T 8/4291* (2013.01)
USPC ...................................... 303/155; 303/117.1

(58) Field of Classification Search
CPC ... B60T 8/4081; B60T 8/4872; B60T 8/4291; B60T 13/142

USPC ........... 303/155, 113.4, 115.1, 117.1; 251/31, 251/63
See application file for complete search history.

(56) References Cited

U.S. PATENT DOCUMENTS

| | | | | |
|---|---|---|---|---|
| 4,706,932 A | * | 11/1987 | Yoshida et al. ................. | 251/31 |
| 5,290,098 A | * | 3/1994 | Burgdorf et al. ........... | 303/115.4 |
| 5,913,577 A | * | 6/1999 | Arndt ......................... | 303/117.1 |
| 6,206,484 B1 | * | 3/2001 | Ganzel ....................... | 303/113.4 |
| 7,497,528 B2 | * | 3/2009 | Reuter et al. ............... | 303/115.2 |

(Continued)

FOREIGN PATENT DOCUMENTS

| | | |
|---|---|---|
| DE | 196 49 010 A1 | 5/1998 |
| JP | 4-163268 A | 6/1992 |

(Continued)

OTHER PUBLICATIONS

International Search Report corresponding to PCT Application No. PCT/EP2010/066436, mailed Apr. 21, 2011 (German and English language document) (7 pages).

*Primary Examiner* — Bradley King
(74) *Attorney, Agent, or Firm* — Maginot, Moore & Beck

(57) ABSTRACT

A hydraulic vehicle braking system having a primary braking cylinder to which the vehicle braking system is connected via a separating valve is disclosed. The vehicle breaking system includes slip control. A pedal path simulator is a spring-loaded hydraulic accumulator, which can be connected to the primary brake cylinder via a differential pressure controlled simulator valve. The simulator valve opens when a braking pressure in the vehicle braking system is greater than a primary braking cylinder pressure; otherwise, the simulator valve is closed. If the separating valve is closed during slip control, for example, the primary braking cylinder forces braking fluid through the opened simulator valve into the hydraulic accumulator upon actuation so that a normal pedal characteristic occurs at least approximately when the separating valve is closed.

4 Claims, 1 Drawing Sheet

(56) References Cited

U.S. PATENT DOCUMENTS

2004/0123593 A1  7/2004  Nakashima et al.
2006/0071547 A1* 4/2006  Holder .................... 303/117.1

FOREIGN PATENT DOCUMENTS

| | | |
|---|---|---|
| JP | 5-162624 A | 6/1993 |
| JP | 2005-104336 A | 4/2005 |
| JP | 2005-239002 A | 9/2005 |
| JP | 2008-213633 A | 9/2008 |
| JP | 2009-511315 A | 3/2009 |
| WO | 97/32766 A1 | 9/1997 |
| WO | 98/26966 A1 | 6/1998 |
| WO | 00/73116 A1 | 12/2000 |

* cited by examiner

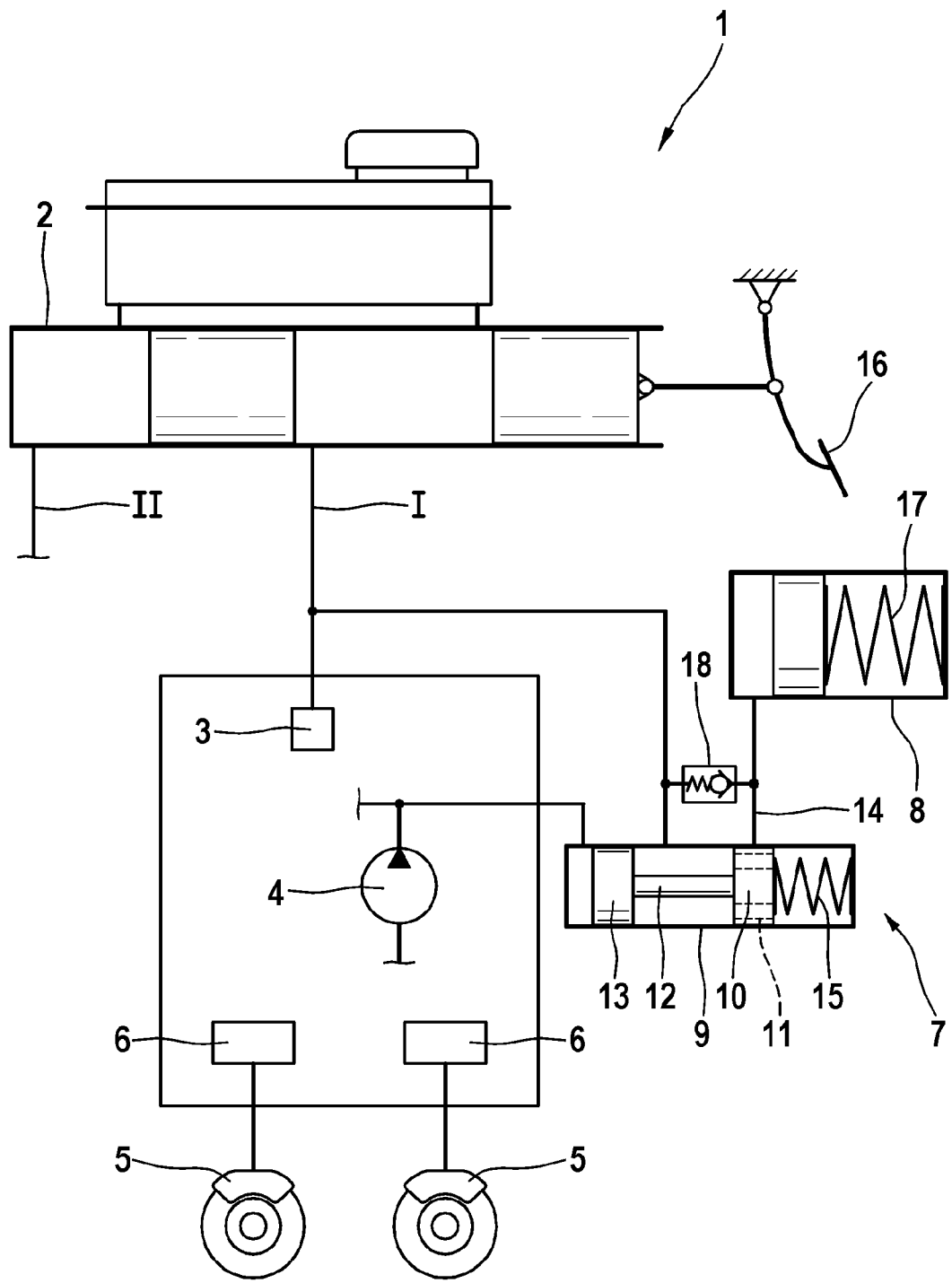

HYDRAULIC VEHICLE BRAKING SYSTEM

This application is a 35 U.S.C. §371 National Stage Application of PCT/EP2010/066436, filed on Oct. 29, 2010, which claims the benefit of priority to Serial No. DE 10 2009 055 224.3, filed on Dec. 23, 2009 in Germany, the disclosures of which are incorporated herein by reference in their entirety.

The disclosure relates to a hydraulic vehicle braking system.

BACKGROUND

In hydraulic vehicle braking systems which have anti-slip regulation, the brake circuits are usually connected to a brake master cylinder via separating valves and are separated hydraulically from the brake master cylinder by closing the separating valves during an anti-slip regulation operation. As a result, feedback effects of the anti-slip regulation on the brake master cylinder are avoided, in particular a pulsing brake pedal on account of a pulsing delivery of brake fluid into each brake circuit by means of a hydraulic pump which is usually configured as a piston pump. In the reverse case, a disruption of a build-up of brake pressure and brake pressure regulation by the brake master cylinder are also avoided during pressure regulation by closing the separating valves. Anti-slip regulation means are known as anti-lock braking system, acceleration-slip regulation and vehicle-dynamics regulation or electronic stability program; the abbreviations ABS, ASR, FDR and ESP are customary. The list is not exhaustive.

The separation of the brake master cylinder from the brake circuits of the vehicle braking system by closing of the separating valves has the consequence that a brake fluid volume is shut in the brake master cylinder and as good as no pedal travel or, in more general terms, no actuating travel is possible at the brake master cylinder on account of the incompressibility of the brake fluid. The brake pedal which feels "hard" and virtually immovable unsettles a vehicle driver and makes the metering of a pedal force or, in general, an actuating force difficult, that is to say a muscular force which is exerted by the vehicle driver for brake actuation. To make matters worse, there is the additional situation that the "hardened" brake pedal regularly occurs in a driving situation which is critical anyway, when the anti-slip regulation intervenes.

Pedal travel simulators are therefore known. These are usually spring-loaded hydraulic accumulators which are connected to the brake master cylinder and into which the brake master cylinder displaces brake fluid when it is actuated. The pedal travel simulator makes an actuating travel possible at the brake master cylinder when the latter is separated hydraulically from the brake circuits by closing of the separating valves. A spring element of the hydraulic accumulator generates a pedal force; an at least approximately usual pedal feel is possible, that is to say the usual dependence of an actuating force on the actuating travel as in a brake actuation without anti-slip regulation. The spring loading can also take place, for example, by gas pressure, and the hydraulic accumulator can therefore be a gas pressure accumulator.

In order that no brake fluid is displaced out of the brake master cylinder into the pedal travel simulator in the event of a normal brake actuation without anti-slip regulation, a simulator valve can be provided between the pedal travel simulator and brake master cylinder, which simulator valve separates the pedal travel simulator from the brake master cylinder and, when the separating valves are closed, connects it to the brake master cylinder. Solenoid valves are used as simulator valves.

A further application for a pedal travel simulator is electrohydraulic vehicle braking systems. These are power-assisted vehicle braking systems, in which the brake pressure is generated by power assistance from a hydraulic pump and the brake master cylinder is likewise separated hydraulically from the vehicle braking system by closing a separating valve in each brake circuit. In the case of a disruption, auxiliary braking by way of the brake master cylinder is possible by all the separating valves remaining open.

SUMMARY

The hydraulic vehicle braking system according to the disclosure having the features of claim 1 has a spring-loaded hydraulic accumulator as pedal travel simulator which is connected to the brake master cylinder by way of a simulator valve. The simulator valve has hydraulic pressure control; said simulator valve is opened and/or closed by hydraulic pressure of the vehicle braking system. The control pressure for the simulator valve is, in particular, a brake pressure which a hydraulic pump of the vehicle braking system generates, for example, during anti-slip regulation or power-assisted braking, and/or is a brake master cylinder pressure which is generated by the brake master cylinder. The pressure control according to the disclosure of the simulator valve has the advantage that an electronic controller is superfluous. It does not require any power supply. The control is simple and can be configured to be robust and reliable. It can be integrated into an existing vehicle braking system and makes an at least approximately usual pedal feel possible if the brake force is generated by the hydraulic pump instead of the brake master cylinder, and the brake master cylinder is separated hydraulically from the vehicle braking system.

Advantageous refinements and developments of the disclosure are set forth below.

Claim 4 provides a differential pressure valve as simulator valve or differential pressure control of the simulator valve. The simulator valve is opened or is loaded in an opening direction by the brake pressure which the hydraulic pump generates, and it is closed or is loaded in the closing direction by the brake master cylinder pressure. If the brake pressure which is generated by the hydraulic pump is greater than the brake master cylinder pressure, the simulator valve is opened, and otherwise it is closed or remains closed. Open means that the simulator valve connects the hydraulic accumulator to the brake master cylinder, and closed means that the hydraulic accumulator is separated from the brake master cylinder. A differential pressure, by which the brake pressure has to be greater than the brake master cylinder pressure in order to open the simulator valve, can be brought about, for example, by way of a spring element.

BRIEF DESCRIPTION OF THE DRAWING

In the following text, the disclosure will be explained in greater detail using an embodiment which is shown in the drawing. The single FIGURE shows a simplified and diagrammatic hydraulic circuit diagram of a hydraulic vehicle braking system according to the disclosure.

DETAILED DESCRIPTION

The hydraulic vehicle braking system 1 according to the disclosure which is shown in the drawing has a two-circuit brake master cylinder 2, to which two brake circuits I, II are connected, of which one brake circuit I is shown in simplified and diagrammatic form.

The other brake circuit II is not shown for the sake of simplicity. The brake circuit I has a separating valve 3, by way of which said brake circuit I is connected to the brake master cylinder 2. The brake master cylinder 2 can be separated hydraulically from the brake circuit I by closing the separating valve 3. A brake pressure can be generated in the brake circuit I by way of a hydraulic pump 4. Hydraulic wheel brakes 5 are connected to the brake circuit I by way of wheel brake pressure modulation valve arrangements 6. Wheel brake pressure modulation valve arrangements 6 of this type usually have a brake pressure increasing valve and a brake pressure decreasing valve, by way of which wheel-individual wheel brake pressure regulation is possible in the wheel brakes 5. Wheel brake pressure modulation valve arrangements 6 of this type and their function are known per se and are not to be explained in greater detail here. Wheel-individual wheel brake pressure regulation takes place with respect to anti-slip regulation, for example anti-lock braking system, acceleration-slip regulation and/or vehicle-dynamics regulation or electronic stability program, for which abbreviations such as ABS, ASR, FDR and ESP are customary. Distance regulation in a speed-dependent manner from a vehicle driving in front is also possible. Regulation of this type is called automatic distance regulation (ADR) or adaptive cruise control (ACC). If anti-slip regulation is mentioned in the following text, other brake pressure and wheel brake pressure regulation operations are also to be understood by it, such as the abovementioned distance regulation.

The brake circuit II (not shown) is constructed in accordance with the brake circuit I which is shown.

The vehicle braking system 1 according to the disclosure has a pedal travel simulator 7 which comprises a spring-loaded hydraulic accumulator 8 and a simulator valve 9. The simulator valve 9 has pressure control; it is opened by a brake pressure in the vehicle braking system 1 and is closed by a brake master cylinder pressure in the brake master cylinder 2. The pressure control is differential pressure control; the simulator valve 9 is opened if the brake pressure in the vehicle braking system 1 is greater than the brake master cylinder pressure; otherwise, the simulator valve 9 is closed. Closed means that the simulator valve 9 separates the hydraulic accumulator 8 from the brake master cylinder 2, and open means that the simulator valve 9 connects the hydraulic accumulator 8 to the brake master cylinder 2.

In the embodiment shown of the disclosure, the simulator valve 9 is a slide valve in the configuration of a piston valve. As shut-off body, the simulator valve 9 has a shut-off piston 10 which can generally also be considered to be a slide. The shut-off piston 10 has passages 11, with the result that the same pressure always prevails on its two sides and does not bring about any resulting force.

The shut-off piston 10 is connected rigidly to a control piston 13 by way of a piston rod 12; both pistons 10, 13 are arranged in a cylinder or a cylinder bore of the simulator valve 9. The two sides of the shut-off piston 10 communicate with one another through the passages 11. The control piston 13 has a double action; its one side is loaded with the brake pressure of the vehicle braking system 1 and its other side is connected to the brake master cylinder 2, that is to say it is pressure-loaded by the brake master cylinder 2. One side of the control piston 13 is connected to the brake circuit I on a side of the separating valve 3, which side faces away from the brake master cylinder 2, for example to a pressure side of the hydraulic pump 4.

If the brake pressure which, for example, the hydraulic pump 4 generates in the vehicle braking system 1 or in the brake circuit I when the separating valve 3 is closed is greater than the brake master cylinder pressure, the pressure difference which acts on the control piston 13 as a result displaces the control piston 13 to the right in the drawing. Via the piston rod 12, the control piston 13 displaces the shut-off piston 10 which opens a connection 14 to the hydraulic accumulator 8, that is to say connects the hydraulic accumulator 8 to the brake master cylinder 2. If the brake master cylinder pressure is at least as great as the brake pressure which the hydraulic pump 4 generates in the brake circuit I, equal pressure prevails on both sides of the double action control piston 13, or a pressure difference prevails which loads the control piston 13 to the left in the drawing, that is to say into a closed position. In the case of equal pressure at the control piston 13, a valve closing spring 15 restores the two pistons 10, 13 into the closed position. In summary, this means that, if the brake pressure which the hydraulic pump 4 generates in the brake circuit I of the vehicle braking system 1 is greater than the brake master cylinder pressure, the simulator valve 9 is opened, that is to say it connects the brake master cylinder 2 to the hydraulic accumulator 8. Otherwise, the simulator valve 9 is closed and the hydraulic accumulator 8 is separated from the brake master cylinder 2.

As a result of the connection of the hydraulic accumulator 8 to the brake master cylinder 2 by opening of the simulator valve 9, it is possible to displace brake fluid out of the brake master cylinder 2 into the hydraulic accumulator 8. This makes a movement at a brake pedal 16 possible in the case of closed separating valves 3. A simulator spring element 17 in the hydraulic accumulator 8 brings about a pedal force, with the result that, in the case of closed separating valves 3, at least approximately the same dependence of a pedal force on a pedal travel at the brake pedal 16 and therefore at least approximately a usual pedal feel prevail as in the case of open separating valves 3 and closed simulator valve 9, that is to say the hydraulic accumulator 8 is separated from the brake master cylinder 2. The hydraulic accumulator 8 and the simulator valve 9 which has the described differential pressure control form, as has already been said, a pedal travel simulator 7 which brings about the described, at least approximately usual pedal force/pedal travel dependence at the brake pedal 16 in the case of closed separating valves 3.

The hydraulic accumulator 8 is connected to the brake master cylinder 2 by way of a nonreturn valve 18, through which flow can pass in the direction of the brake master cylinder 2. After the vehicle braking system 1 is released, the simulator spring element 17 displaces residual brake fluid which is possibly still present in the hydraulic accumulator 8 into the brake master cylinder 2 by way of the nonreturn valve 18. After a braking operation has ended, the hydraulic accumulator 8 is empty or emptied in this way.

A second pedal travel simulator 7 is possible, but not necessary, in the brake circuit II (not shown).

The invention claimed is:
1. A hydraulic vehicle braking system, comprising:
   at least one brake circuit; and
   a brake master cylinder connected to the at least one brake circuit through a separating valve,
   wherein the at least one brake circuit has (i) a hydraulic pump configured to generate a brake pressure in the vehicle braking system, and (ii) a spring-loaded hydraulic accumulator connected to the brake master cylinder by a simulator valve,
   wherein the simulator valve is a differential pressure valve including a double action control piston having a first side and a second side,
   wherein the first side is loaded with the brake pressure of the vehicle braking system and the second side is loaded with a brake master cylinder pressure, wherein the simulator valve is configured to be closed when the brake pressure is less than or equal to the master cylinder pressure, and is configured to be open only when the brake pressure is greater than the brake master cylinder pressure, wherein the simulator valve is a piston valve having a shut-off body, which is a shut-off piston connected mechanically to the control piston and is arranged in a cylinder with the control piston, opposite sides of the shut-off piston being in fluid communication with one another, and wherein the opposite sides of the shut-off piston are in fluid communication with one another through a passage in the shut-off piston.

2. The hydraulic vehicle braking system as claimed in claim 1, wherein the shut-off piston is rigidly connected to the control piston.

3. The hydraulic vehicle braking system as claimed in claim 1, wherein the hydraulic accumulator is additionally connected to the brake master cylinder by a nonreturn valve configured to pass fluid only in the direction of the brake master cylinder.

4. The hydraulic vehicle braking system as claimed in claim 3, wherein the nonreturn valve connects the hydraulic accumulator to the brake master cylinder independently of the simulator valve.

* * * * *

UNITED STATES PATENT AND TRADEMARK OFFICE
CERTIFICATE OF CORRECTION

PATENT NO. : 8,827,380 B2  Page 1 of 1
APPLICATION NO. : 13/518459
DATED : September 9, 2014
INVENTOR(S) : Heiko Druckenmueller It is certified that error appears in the above-identified patent and that said Letters Patent is hereby corrected as shown below:

On the title page, the inventor's place of residence should read:

Item (75)   Inventor:   Heiko Druckenmueller, Mundelsheim (DE)

Signed and Sealed this
Thirtieth Day of June, 2015

Michelle K. Lee
*Director of the United States Patent and Trademark Office*